(12) United States Patent
Hirotsune et al.

(10) Patent No.: US 6,854,126 B2
(45) Date of Patent: Feb. 8, 2005

(54) INFORMATION RECORDING MEDIUM WITH SIO₂-IN₂O₃-SNO₂-ZNS PROTECTIVE LAYER

(75) Inventors: Akemi Hirotsune, Saitama (JP); Motoyasu Terao, Hinode (JP); Yumiko Anzai, Ome (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 10/345,231

(22) Filed: Jan. 16, 2003

(65) Prior Publication Data

US 2004/0027982 A1 Feb. 12, 2004

(30) Foreign Application Priority Data

Aug. 8, 2002 (JP) ........................ 2002-230756

(51) Int. Cl.⁷ ........................... G11B 7/24; G11B 23/03
(52) U.S. Cl. ......................................... 720/719
(58) Field of Search ............................... 720/719, 718; 369/284, 283, 272.1

(56) References Cited

FOREIGN PATENT DOCUMENTS

| JP | 62-239443 A | * | 10/1987 |
| JP | 3-240590 A | * | 10/1991 |
| JP | 5-174435 A | * | 7/1993 |
| JP | 5-234133 A | * | 9/1993 |
| JP | 2001-266408 | | 9/2001 |

* cited by examiner

Primary Examiner—Julie Anne Watko
(74) Attorney, Agent, or Firm—Mattingly, Stanger & Malur, P.C.

(57) ABSTRACT

In an information recording medium, a first protective layer, a recording film, a second protective layer and a reflective layer are provided on a substrate sequentially from a side where light is irradiated, the first protective layer having a film thickness of 2 nm to 25 nm. 95 atomic % or more of a material of the first protective layer is $SiO_2$—$In_2O_3$—$SnO_2$—$ZnS$, and a ZnS amount in the first protective layer is in the range of 4 mol % to 33 mol %.

8 Claims, 8 Drawing Sheets

INFORMATION RECORDING MEDIUM WITH SIO$_2$-IN$_2$O$_3$-SNO$_2$-ZNS PROTECTIVE LAYER

BACKGROUND OF THE INVENTION

The present invention relates to an information recording medium used in an optical disk.

There are known various principles of recording information on a thin film (recording film) by laser beam irradiation. Among them, a principle utilizing a change in atomic arrangement by the laser beam irradiation, such as a phase change (also called a phase transition or a phase transformation) of a film material, is hardly subjected to deformation of the thin film, thus having an advantage of obtaining an information recording medium having a double-sided disk structure obtained by sticking two disk members together directly.

Generally, such an information recording medium has a constitution in which a first protective layer, a recording film of GeSbTe series and the like, an upper protective layer and a reflective layer are provided on a substrate. In JP-A-2001-266408, description is made concerning that $(ZnS)_{60}(SiO_2)_{30}C_{10}$ is used as a first protective layer and a film thickness thereof is set in the range of 50 nm to 400 nm.

Note that, in the present specification, the term "phase change" is used including not only a meaning of phase change between a crystalline state and an amorphous state but also melting (a change to a liquid phase), recrystallization and a phase change between two crystalline states. Moreover, mark edge recording is a recording method for making an edge portion of a recording mark correspond to a signal "1" and making between marks or inside the mark correspond to a signal "0". In the present specification, an optical disk refers to a disk, in which information reproducible by light irradiation is recorded, and/or to a device for reproducing information by the light irradiation.

SUMMARY OF THE INVENTION

In a rewritable optical disk such as a DVD-RAM (Digital Versatile Disk-Random Access Memory), a recording track is composed of a pre-format portion, in which address pits and the like are provided, and a user data portion having grooves for tracking and performing recording. In the optical disk, recording and reading of information are performed after an address is confirmed and a clock and a synchronization signal are detected.

However, since the first protective layer is as thick as 100 nm or more and deformations caused by stress acting between laminated films and the substrate are different between the pre-format portion and the user data portion, the recording track falls into a bent state with respect to the pre-format portion. Thus, in the case of performing push-pull tracking for the tracking grooves, address data in the pre-format portion are unreadable. When a tracking offset is corrected so as to set the recording track in a normal position with respect to the pre-format portion, there occurs a problem that an offset in a recording area partially deletes data of an adjacent track.

Furthermore, as described in JP-A-2001-266408, when the first protective layer is as thick as 50 nm or more, a tact time of sputtering is long due to time-consuming film formation. Thus, there occurs a problem that mass productivity is low. Here, thinning of the first protective layer is conceivable, however, if the first protective layer is thin, heat generated in the recording film in the numerous rewritings is transmitted to the substrate, thus causing a problem of likely deterioration in the substrate. An object of the present invention is to solve the foregoing problems and to provide an information recording medium, in which the stress between the laminated films and the substrate is small, material costs and mass productivity are excellent and the substrate is unlikely to deteriorate in the numerous rewritings.

In order to solve the foregoing problems, in the information recording medium of the present invention, the following countermeasure is used. Specifically, the film thickness of the first protective layer is set as thin as in the range of 2 nm to 25 nm, 95 atomic % or more of a material of the first protective layer is composed of SiO$_2$—In$_2$O$_3$—SnO$_2$—ZnS, and a ZnS amount in the first protective layer is set in the range of 4 mol % to 33 mol %. Consequently, the number of possible rewrites becomes 300 times or more, leading to a combined effect in mass productivity and rewriting properties.

Furthermore, it is more preferable that the film thickness of the first protective layer is set in the range of 4 nm to 20 nm and the ZnS amount in the first protective layer is set in the range of 6 mol % to 30 mol %. Consequently, the number of possible rewrites becomes 1000 times or more, leading to a combined effect in mass productivity and rewriting properties.

A basic technology of a recording device (an optical disk drive) using a phase change recording medium of the present invention is as below.

(1-beam Overwriting)

Figure 2:
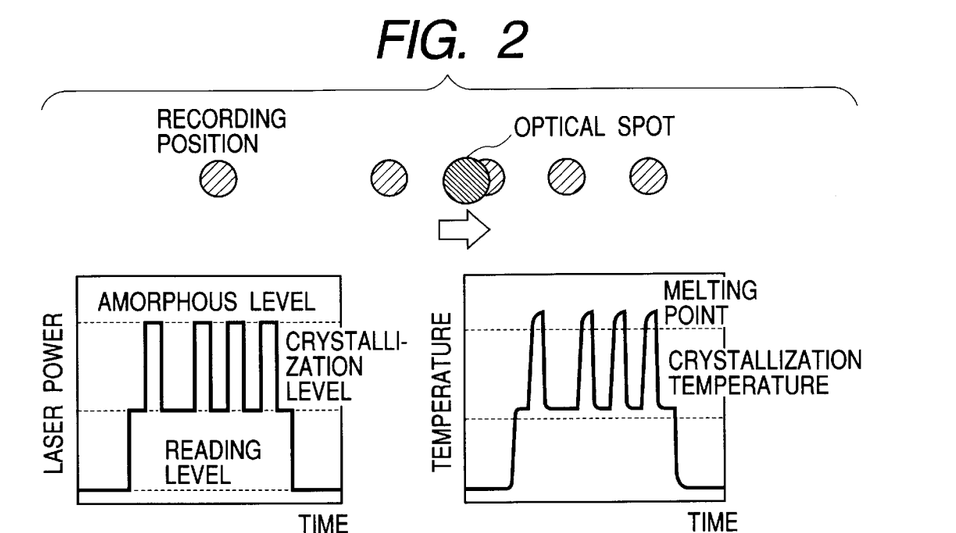
FIG. 2 is an explanatory view of a principle of overwriting.

In general, the phase change recording medium performs rewriting by overwriting (rewriting of information by overwriting without previously deleting recorded information). A principle of the above-description is shown in FIG. 2. When a recording film is melt by use of a high laser power, the recording film is quenched after the irradiation, and thus a recording mark in an amorphous state is obtained even when a previous state of the recording film is crystalline or amorphous. When the recording film is heated up to a temperature below a melting point, at which a crystallization rate is high, by use of an intermediate laser power, a part previously in the amorphous state turns into the crystalline state and a part originally in the crystalline state stays in the crystalline state as it is. It is conceived that moving images are often recorded in the DVD-RAM, and thus a large amount of information is recorded at one time. In this case, if the recording is performed after deleting all the recorded information in advance, time required therefor doubles. Moreover, there is a possibility that an enormous quantity of buffer memory may be required. Therefore, it is an essential condition that the phase change recording medium is overwritable.

(Mark Edge Recording)

Figure 3:
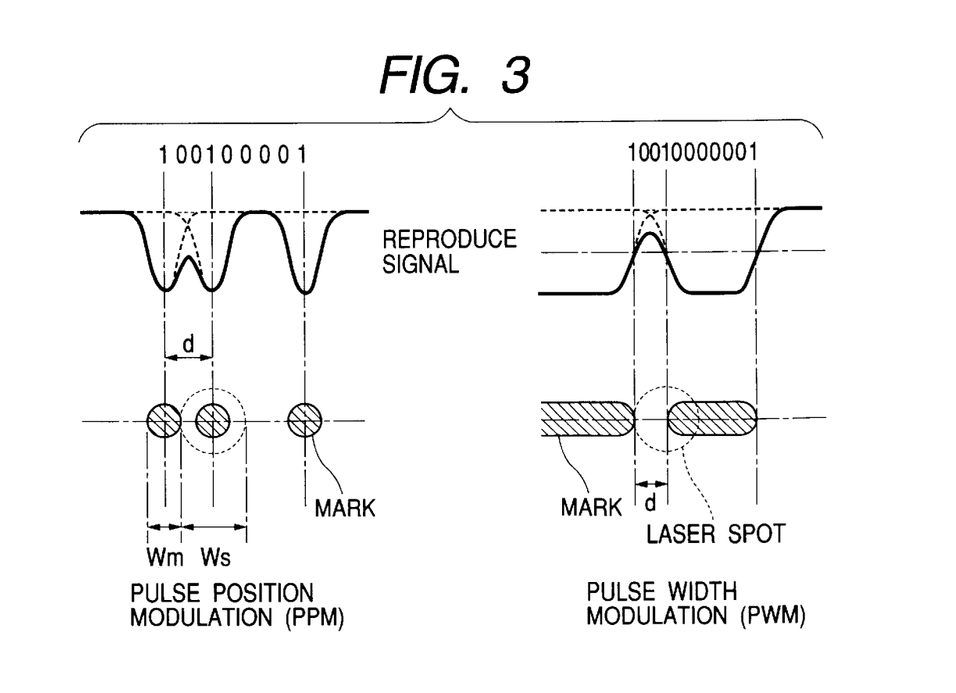
FIG. 3 is an explanatory view of mark position recording and mark edge recording.

In the DVD-RAM and a DVD-RW (Digital Versatile Disk-Rewritable), a mark edge recording method is adopted, which can realize a high-density recording. In the mark edge recording, positions of both edges of a recording mark formed on a recording film are made to correspond to digital data of 1. Accordingly, a length of a shortest recording mark is made to correspond not to one reference clock but to two to three reference clocks, thus enabling the high-density recording. In the DVD-RAM, an 8-16 modulation system is adopted, and the length of the recording mark is made to correspond to three reference clocks. As shown in a comparison of FIG. 3, compared to a mark position recording in which a center position of a circle recording mark is made to correspond to the digital data of 1, the mark edge recording method has an advantage of capability of performing the high-density recording without reducing the recording mark to an extremely small size. However, for the recording medium it is required that deformation in a shape of the recording mark is extremely small. In FIG. 3, Ws is a diameter of a beam spot, Wm is a mark length, and d is a resolution.

(Format)

Figure 4:
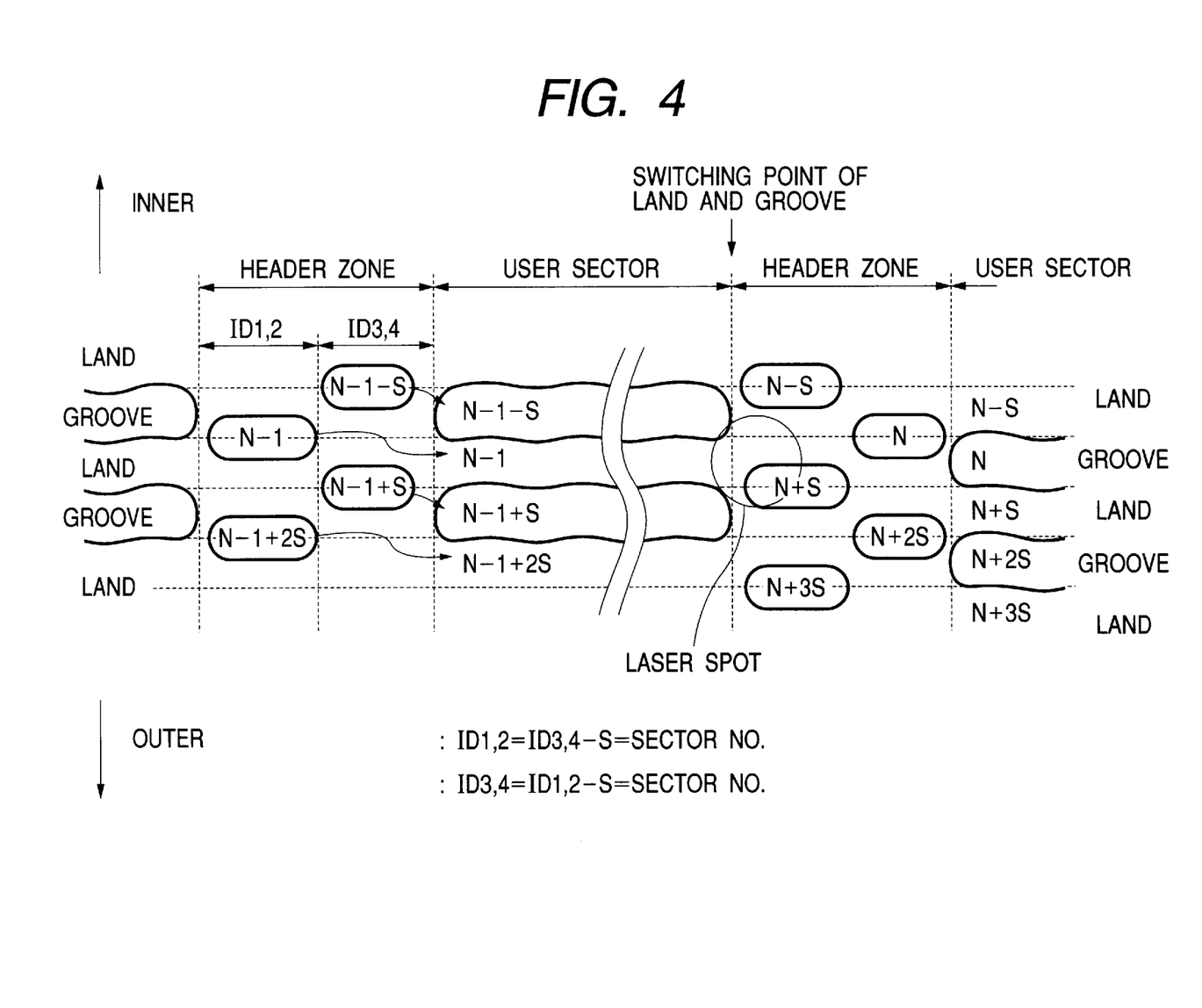
FIG. 4 is a schematic view showing header zones of a format of a substrate.

As dispositions of header zones at the beginning of respective sectors as shown in FIG. 4, a DVD-RAM is a format in which 1 lap of track is divided into 24 sectors. Thus, random access recording is possible. Therefore, the DVD-RAM can be used for various purposes from a storage device installed in a personal computer, a DVD video camera to a DVD video recorder. In FIG. 4, S is a number of sectors in a track.

(Land/groove Recording)

Figure 5:
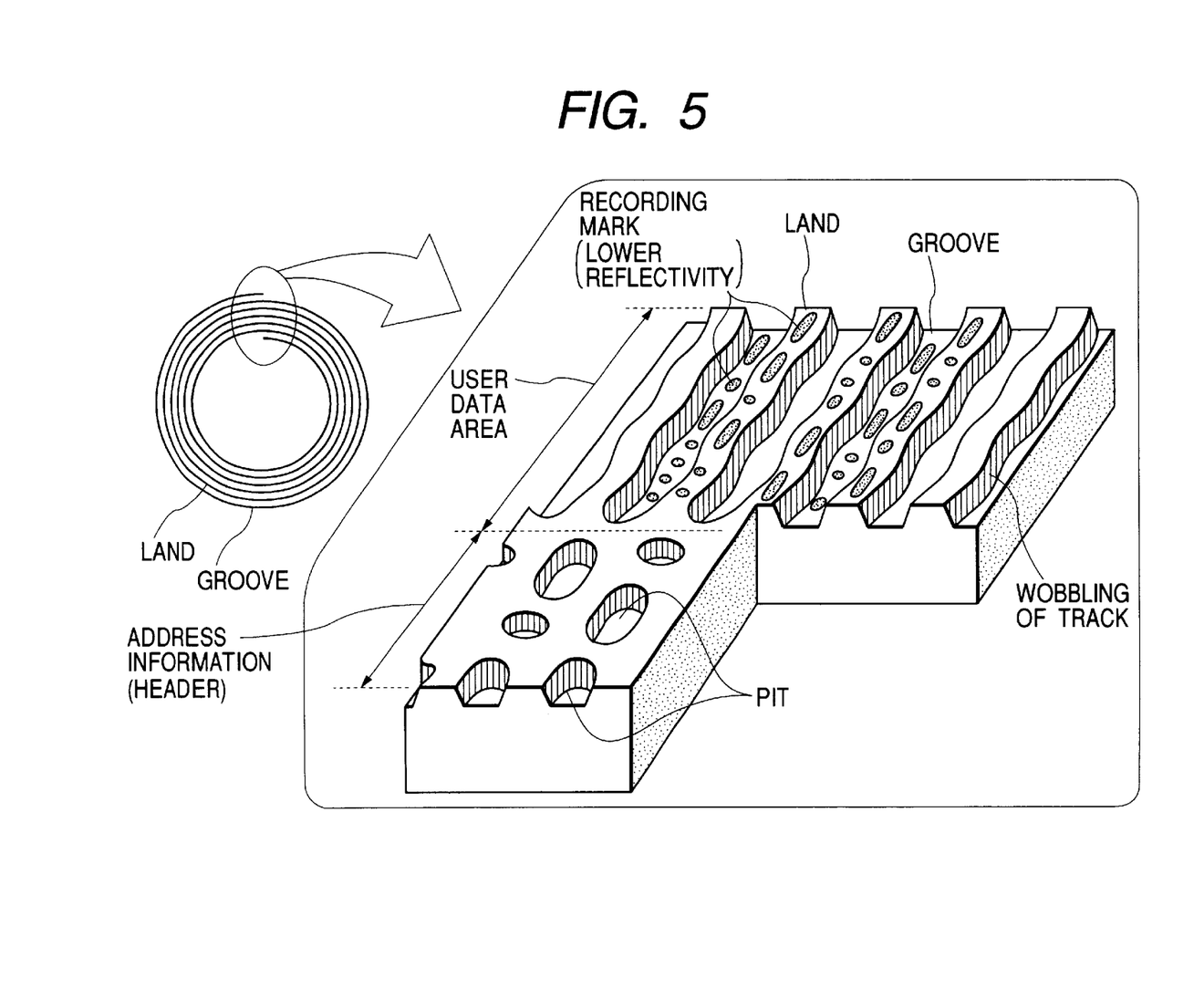
FIG. 5 is a schematic view showing the format of the substrate.

In the DVD-RAM, as shown in FIG. 5, by land/groove recording for recording both within tracking grooves and on protrusions between the grooves, crosstalk is reduced. In the land/groove recording, a phenomenon is utilized, in which a recording mark of an adjacent track is hard to be seen in either a land or a groove when a groove depth is set to around $\lambda/6n$ ($\lambda$ is a laser wavelength, and n is a refractive index of a substrate) for a recording mark of reflectivity change like "black and white" without phase difference component. Thus, in an example of a 4.7 GB DVD-RAM, a track pitch can be made as narrow as 0.615 $\mu$m. A phase difference between the recording mark and a portion other than the recording mark, that is, a phase difference component of a reproduce signal acts in a direction where crosstalk is apt to occur, and thus it is required to design the phase difference component to be sufficiently small. The phase difference component of the reproduce signal is added to reflectivity-change reproduce signals of the land and the groove at the phase opposite to each other, resulting in unbalance of reproduce signal levels of the land and the groove.

(ZCLV Recording Method)

Figure 6:
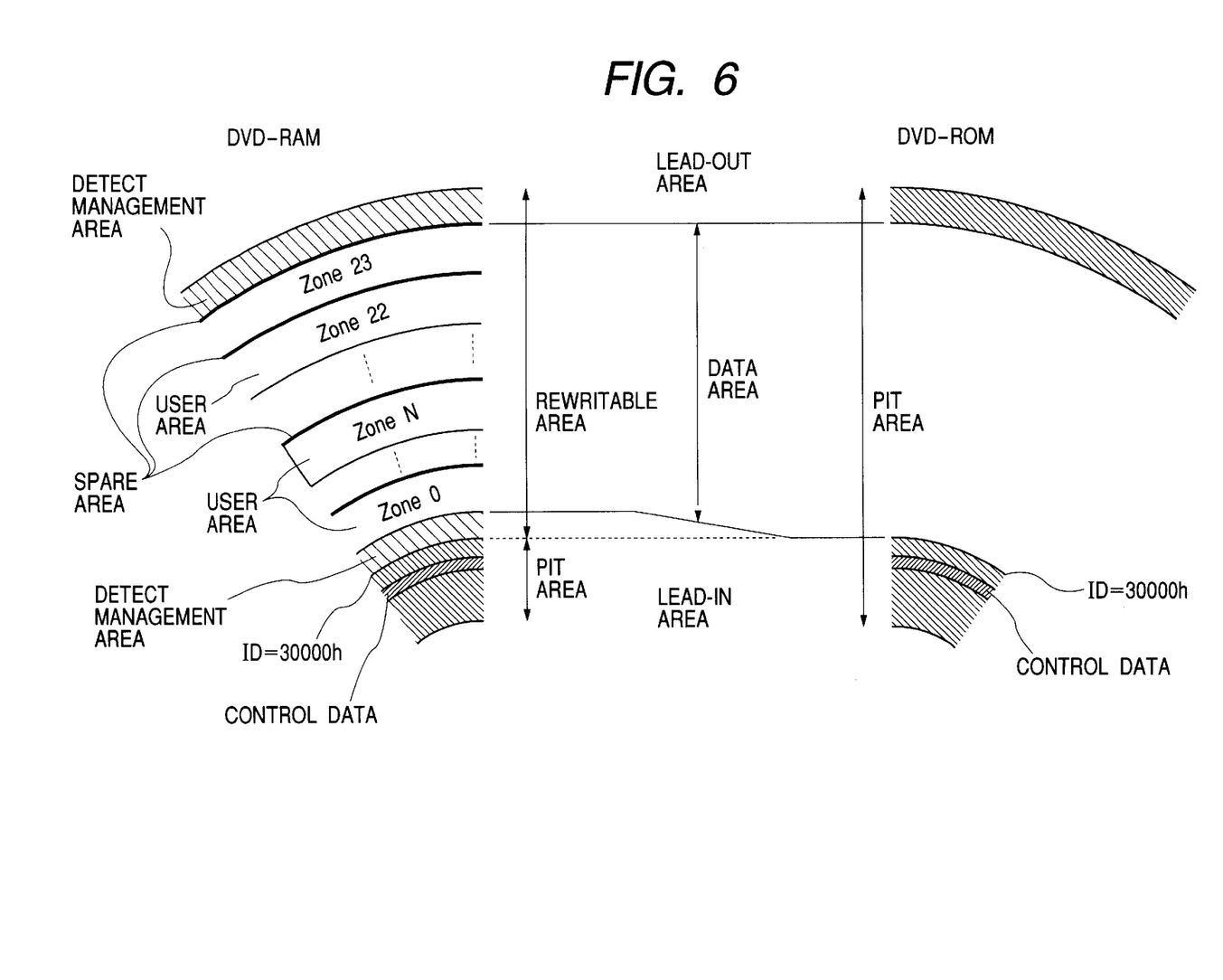
FIG. 6 is a schematic view showing zone disposition of the format of the substrate.

In a phase-change recording medium, when a recording waveform is not changed, it is desirable to record at an optimal linear velocity corresponding to a crystallization rate in order to obtain a satisfactory recording and reproducing characteristic. However, in accessing between recording tracks with different radii on a disk, it takes time to change the revolution speed in order to have the same linear velocity. Therefore, in the DVD-RAM, as shown in FIG. 6, a ZCLV (zoned constant linear velocity) method is adopted, in which a radius direction of the disk is divided into 24 zones so as not to reduce an access speed, the revolution speed is kept constant in each zone, and the revolution speed is changed only when an access must be made to a different zone. In this method, linear velocities are slightly different between an innermost track in the zone and an outermost track therein, and thus recording densities thereof are slightly different from each other. However, recording is possible close to the maximum density all over the disk.

(Recording Waveform)

Figure 8:
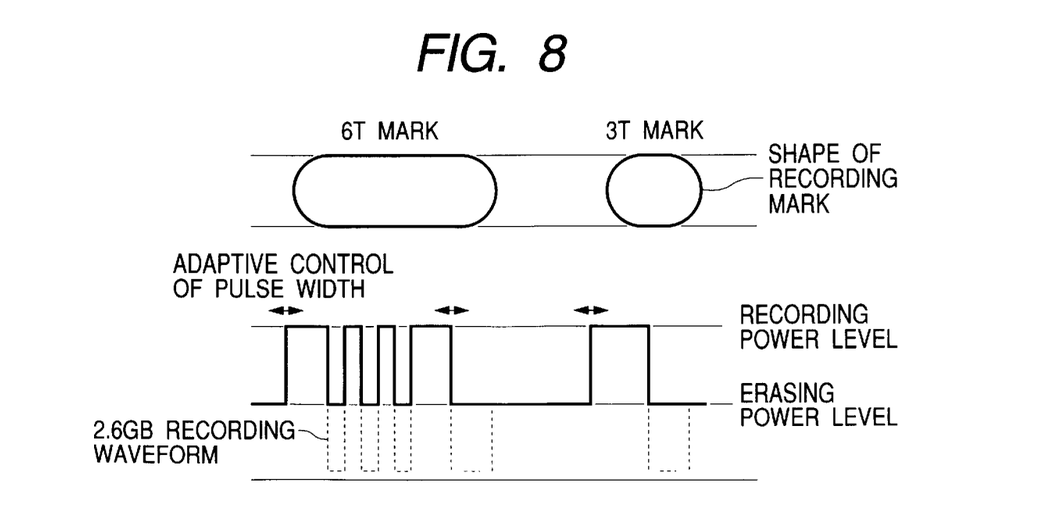
FIG. 8 is a schematic view showing a relationship between adaptive control of a recording waveform and a mark length.

Between a recording waveform and a recording mark shape, there is a relationship as described below. In the 4.7 GB DVD-RAM, for example, a shortest mark length is 0.42 $\mu$m and a linear velocity is 8.2 m/s, and thus a recording pulse for forming one recording mark is divided into multiple parts. In order to precisely form the recording mark, an emphasis is placed on precise heating rather than prevention of a buildup of heat, and as shown in FIG. 8, a recording waveform is obtained, in which parts below a deleting power level are few or do not exist at all. Moreover, as already described above, an adaptive control of widths of the first pulse and the last pulse, which form the recording mark, is also necessary. Specifically, the adaptive control means that, in accordance with a length of a space, to which an attention is paid, and a length of a previous mark, adjustment is made for a position where a last pulse forming the previous mark ends and for a position where a first pulse forming a following mark starts.

The technologies offering technical advantages will be summed up as below.

1. Technologies contributing to making a track pitch narrower land/groove recording, absorption control, thinning of the first protective layer and thinning of a reflective layer
2. Technologies contributing to making a bit pitch narrower mark edge recording, ZCLV recording method, absorption control, interface layer and adaptive control of a recording waveform
3. Technologies contributing to speeding up 1-beam overwriting, recording film composition, absorption control and interface layer As described above, one layer has a plurality of roles, and functions of the respective layers are intricately intertwined with each other. The stress reduction by the thinning of the first protective layer prevents groove deformation, thus contributing to the making of the track pitch narrower. Therefore, the optimal selection of a combination of laminated films and the selection of film thickness are extremely important in offering the technical advantages.

Other objects, features and advantages of the invention will become apparent from the following description of the embodiments of the invention taken in conjunction with the accompanying drawings.

DESCRIPTION OF THE EMBODIMENTS

Hereinafter, the present invention will be described in detail according to embodiments.

[Embodiment 1]

(Constitution of an Information Recording Medium of the Present Invention and a Manufacturing Method Thereof)

Figure 1:
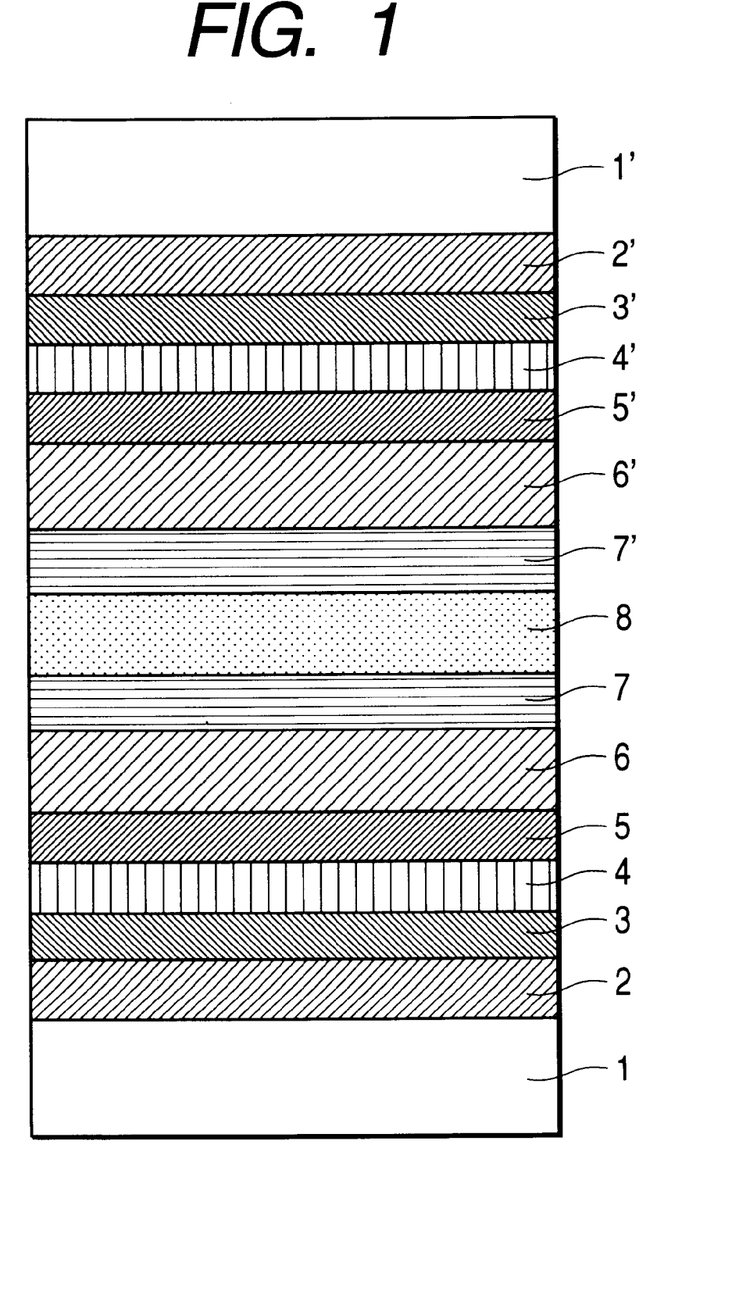
FIG. 1 is a section view schematically showing an example of an information recording medium according to the present invention.

FIG. 1 is a view showing a cross-section structure of a disk-shaped information recording medium according to a first embodiment of the present invention. The above medium is manufactured as described below.

First, on a polycarbonate substrate 1 with a diameter of 12 cm and a thickness of 0.6 mm, which has tracking grooves of land/groove recording at a track pitch of 0.615 micron on its surface and has pit rows expressing address information and the like at a position shifted from a track center, that is, approximately on an extension of a boundary line of a land and a groove, a first protective layer 2 made of $(SiO_2)_{60}((In_2O_3)_{90}(SnO_2)_{10})_{25}(ZnS)_{15}$ with a film thickness of 8 nm. Next, a lower interface layer 3 made of a $Cr_2O_3$ film is formed with a film thickness of 2 nm. Subsequently, the followings are sequentially formed, including: a recording film 4 made of $Ge_4Sb_2Te_7$ with a film thickness of 8 nm; a second protective layer 5 made of $SnO_2$ with a film thickness of 33 nm; an absorption control layer 6 made of $Cr_{90}(Cr_2O_3)_{10}$ with a film thickness of 34 nm; and a reflective layer 7 made of Al with a film thickness of 60 nm. Note that, herein, one having a ratio of Cr and oxygen, which is slightly different from 2:3, and one having a ratio of Si and oxygen, which is slightly different from 1:2 are also called $Cr_2O_3$ and $SiO_2$. The slight difference refers to one within ±20%, and herein, the one having the ratio slightly different from 2:3 means one having a ratio in the range of 2:2.4 to 2:3.6.

As described above, the information recording medium of the present invention is formed of laminated films of 6 layers or less, and the film formation thereof can be performed by use of a mass-production device having six chambers of a sputtering device.

Moreover, the all film thicknesses are 150 nm or less, and thus the present invention is extremely excellent in mass productivity compared to a conventional disk (comparative example 1) having a first protective layer with a thickness of 100 nm or more.

Respective composition ratios are described in atomic % or mol %. The formation of the films is performed by use of a magnetron sputtering device using an Ar gas. Accordingly, a first disk member is obtained.

In the foregoing disk, a warp of the substrate is hardly changed before and after the film formation of the foregoing laminated films, thus indicating that stress is not generated.

Meanwhile, by use of a method completely the same as the above, a second disk member having the same constitution as the first disk member is obtained. Thereafter, protective coating by use of ultraviolet curing resin is performed on film surfaces of the first and second disk members, the respective ultraviolet curing resin layers thereof are attached to each other with an adhesive layer interposed therebetween, and the disk-shaped information recording medium shown in FIG. 1 is obtained. Instead of the second disk member, a protective substrate may be used.

(Initial Crystallization Method)

An initial crystallization is performed as below for the recording film of the disk manufactured as described above. The disk is rotated so as to have a linear velocity of a point on a recording track at 6 m/s, and by setting a laser beam power of an oblong semiconductor laser (a wavelength of about 810 nm), of which spot shape is long in a radius direction of the medium, to 600 mW, the recording film 4 is irradiated therewith through the substrate 1. Movement of the spot is shifted by ¼ of a spot length in the radius direction of the medium. The initial crystallization is thus performed. This initial crystallization may be performed once; however, by repeating the initial crystallization twice, a noise increase due to the initial crystallization can be reduced a little.

(Method for Recording, Deleting and Reproducing)

By use of an information recording and reproducing evaluation device, recording and reproducing of information is performed for the foregoing recording medium. Hereinafter, an operation of the information recording and reproducing evaluation device of the present invention will be described. Note that, for a motor control method in performing the recording and reproducing, the ZCLV (zoned constant linear velocity) method, in which the revolution speed of the disk is changed for each zone of performing the recording and reproducing, is adopted. A linear velocity of the disk is about 8.2 m/s.

In recording information in a disk, a recording method for converting information of 8 bits to that of 16 bits, so-called an 8-16 modulation method is used to perform the recording. Information from outside of a recording device is transmitted to an 8-16 modulator while taking 8 bits as one unit. In this modulation method, the recording of information is performed on the medium by use of recording mark lengths of 3T to 14T corresponding to the 8-bit information. Note that "T" herein represents a clock cycle in the information recording, and the clock cycle is set to 17.1 ns here. Digital signals of 3T to 14T, which are converted by the 8-16 modulator, are transferred to a recording waveform generation circuit. In the foregoing recording waveform generation circuit, the signals of 3T to 14T are made to correspond to "0" and "1" alternately in chronological order, a laser power of an intermediate power level is irradiated in the case of "0", a high power pulse or a pulse train is irradiated in the case of "1". In forming a recording mark of 4T or more by setting a width of the high power pulse to about 3T/2 to T/2, a pulse train composed of a plurality of pulses with a high power level is used. Between the pulses of the pulse train, a laser of a low power level with a width of about T/2 is irradiated. In a portion between the foregoing pulse trains where no recording mark is formed, the laser irradiation of the intermediate power level is performed, thus generating a multipulse recording waveform. In this event, the high power level for forming the recording mark is set to 11 mW, the intermediate power level capable of deleting the recording mark is set to 5 mW, and the low power level lower than the intermediate power level is set to 5 mW. As described above, the low power level may be set to be the same as the intermediate power level or to be a different level. Moreover, in this event, an area on the optical disk where the laser beam of the intermediate power level is irradiated is turned into a crystal (a space portion), and an area thereof where the pulse train of the high power level is irradiated is turned into an amorphous recording mark. Moreover, in the foregoing recording waveform generation circuit, in formation of a series of high power pulse trains for forming a mark portion, there is a multipulse waveform table corresponding to a method for changing widths of first and last pulses in a multipulse waveform in accordance with lengths of the space portions before and after the mark portion (adaptive recording waveform control). Thus, a multipulse recording waveform capable of eliminating influences of heat interference generated between marks as much as possible. Moreover, as to the reflectivity of the recording medium, a reflectivity thereof is higher in its crystalline state, and a reflectivity is low in the area recorded and turned into the amorphous state. The recording waveform generated in the recording waveform generation circuit is transferred to a laser drive circuit. The laser drive circuit changes an output power of the semiconductor laser in an optical head based on the transferred waveform. In the optical head installed in the recording device of the present invention, a laser beam with a wavelength of 660 nm is irradiated as an energy beam for information recording, thus performing the information recording.

When the mark edge recording is performed under the above conditions, a mark length of the 3T mark, which is the shortest mark, is about 0.42 μm, and a mark length of the 14T mark, which is the longest mark, is about 1.96 μm. In a recording signal, dummy data composed of repetition of 4T marks and 4T spaces is included in a leader and a trailer of an information signal. In the leader thereof, VFO is also included.

In such a recording method, by recording new information by overwriting without deleting a portion where information is already recorded, the new information is rewritten in the portion. Specifically, overwriting by use of a single and approximately circular optical spot is possible.

Moreover, the recording device of the present invention corresponds to a method for recording information in both grooves and lands (areas between the grooves), so-called a land/groove (L/G) recording method. In the recording device of the present invention, by an L/G servo circuit, tracking relative to the land and the groove can be arbitrarily selected.

The recorded information is reproduced also by use of the foregoing optical head. A laser beam of 1 mW is irradiated on the recording track, and by detecting a light reflected from the mark and the portion other than the mark, a reproduce signal is obtained. The amplitude of the reproduce signal is increased by a preamplifier circuit, then converting into the 8-bit information for every 16 bits by an 8-16 demodulator. By performing the above-described operation, the reproducing of the recorded information is completed.

(Evaluation of a Rewriting Property)

Figure 7:
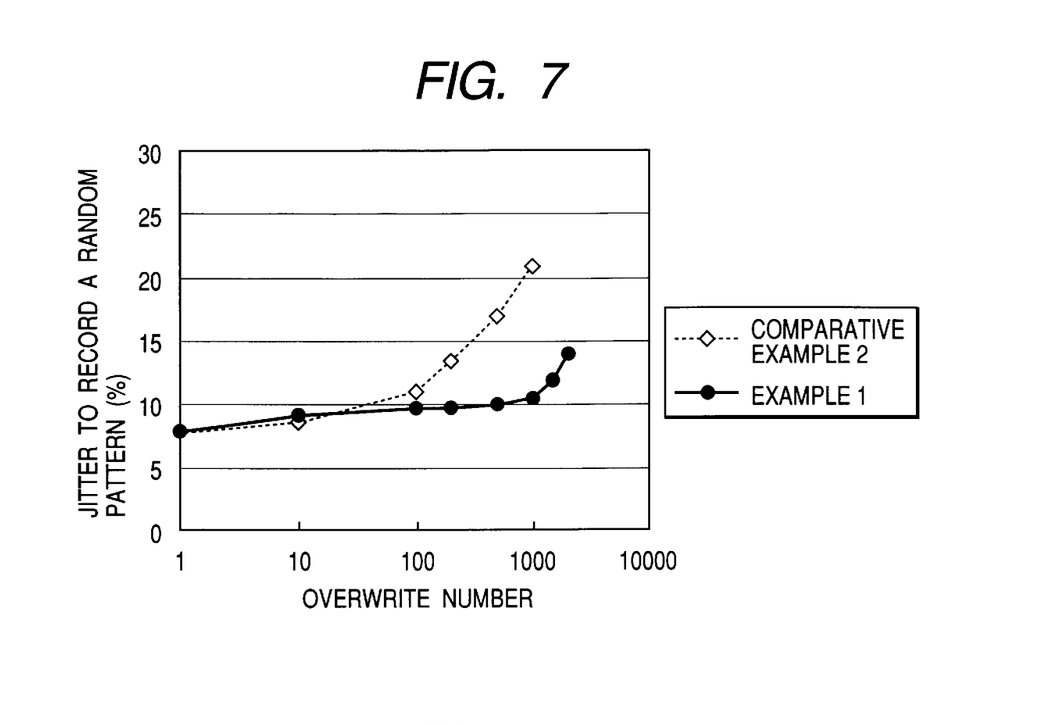
FIG. 7 is a graph showing a relationship between the number of overwriting of the present invention and a jitter.

As to the disk of the embodiment 1, a recording pattern (random pattern) including 3T to 11T randomly is recorded, and a relationship between the number of overwriting and a jitter is investigated. Thus, a result shown in FIG. 7 is obtained. For the jitter, a value obtained by dividing an average value of the land and the groove by the clock cycle T is used. In a comparative example 2, after overwrites of 100 times, the jitter increases up to 13% or more. However, as to the disk of the embodiment 1, even after overwrites of 1000 times, the jitter is 13% or less. Therefore, it is found out that the first protective layer described in the embodiment 1 prevents the substrate from being deteriorated and has a significant effect in increasing the number of possible rewrites.

(Composition and Film Thickness of the First Protective Layer)

As a material of the first protective layer, $SiO_2$ is fixed to 60 mol % and a mol ratio of ITO($(In_2O_3)_{90}(SnO_2)_{10}$) and ZnS is changed. Meanwhile, a composition dependency of the number of possible rewrites is investigated. Moreover, the film thickness of the first protective layer is changed in respective compositions, and a film thickness dependency is investigated.

Figure 11:
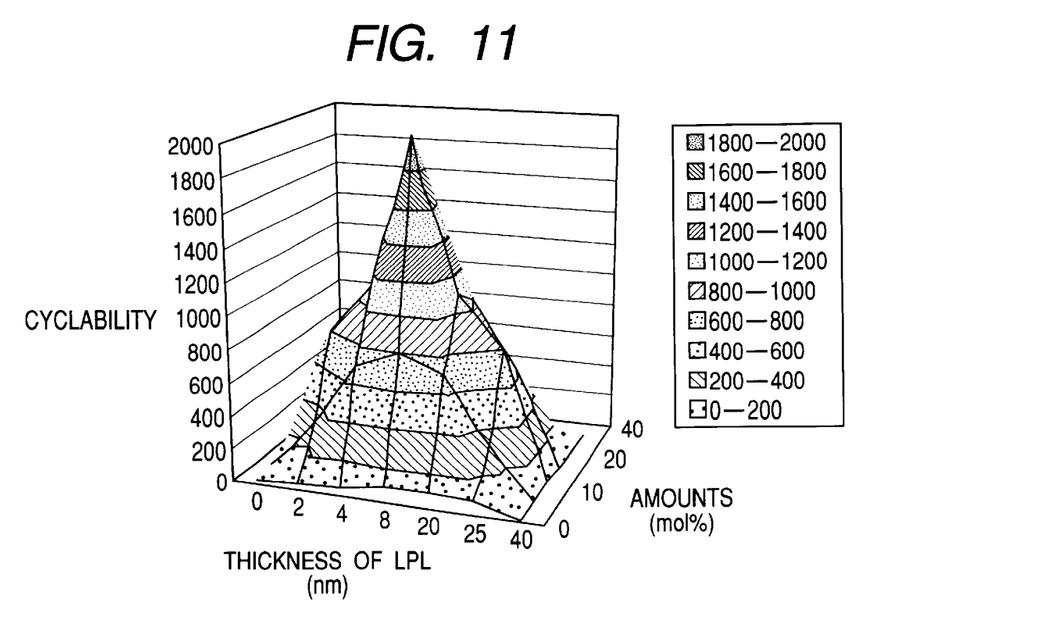
FIG. 11 is a graph showing a relationship among the number of the overwriting of the present invention, the film thickness of the first protective layer and the ZnS additive amount.

Results thus obtained are shown in table 1 and FIG. 11.

TABLE 1

| Film thickness (nm)/ZnS amount (mol %) | 0 | 4 | 6 | 15 | 30 | 33 | 40 |
|---|---|---|---|---|---|---|---|
| 0 | 20 | 20 | 20 | 20 | 20 | 20 | 20 |
| 2 | 40 | 300 | 600 | 800 | 600 | 300 | 40 |
| 4 | 50 | 700 | 1000 | 1100 | 1000 | 700 | 80 |
| 8 | 100 | 800 | 1500 | 2000 | 1500 | 800 | 100 |
| 20 | 100 | 700 | 1000 | 1100 | 1000 | 600 | 100 |
| 25 | 90 | 300 | 600 | 800 | 600 | 300 | 90 |
| 40 | 10 | 10 | 20 | 30 | 20 | 10 | 10 |

Herein, a horizontal axis of table 1 indicates a ZnS amount (mol %), and a vertical axis thereof indicates the film thickness of the first protective layer (nm). In the table, the numbers of possible rewrites are shown. Therefore, it is found out that when the film thickness of the first protective layer is in the range of 2 nm to 25 nm and the ZnS amount in the first protective layer is in the range of 4 mol % to 33 mol %, the number of possible rewrites can be increased as much as 300 times or more. The reason of the above finding will be described below. Specifically, by using a material of $SiO_2$—$In_2O_3$—$SnO_2$—ZnS series in the foregoing composition, optical characteristics are satisfied in the range where the film thickness is thin, including a reflectivity of 15% or more, a large contrast and the like. Moreover, a thermal conductivity of the first protective layer is lowered by addition of ZnS, thus suppressing thermal conduction between the recording film and the substrate. As a result, a thermal characteristic for suppressing the substrate deterioration in the numerous rewritings is satisfied.

Furthermore, when the film thickness of the first protective layer is in the range of 4 nm to 20 nm and the ZnS amount in the first protective layer is in the range of 6 mol % to 30 mol %, the number of possible rewrites is 1000 times or more, which is equivalent to the number of possible rewrites of a DVD-RW and the like (about 1000 times) or more. Thus, it is found out that the foregoing composition is preferable since both of the mass productivity and the rewriting property are included.

Moreover, even when a part of $In_2O_3$ and/or $SnO_2$ in the first protective layer is replaced by any one of $Al_2O_3$, $Ta_2O_5$, $TiO_2$, $Cr_2O_3$, ZnO and a mixture of the foregoing materials, the composition thus obtained is usable.

The use of the material containing $In_2O_3$ or $SnO_2$ enables DC sputtering because of a low electrical resistance of a target and realizes a shorter tact time, and thus the foregoing material is preferable. In the case of replacing $In_2O_3$ and/or $SnO_2$, when a content of any one of the materials including $Al_2O_3$, $Ta_2O_5$, $TiO_2$, $Cr_2O_3$, ZnO and a mixture of the foregoing materials is 50 mol % or less, the DC sputtering is possible. Even in the case where the above-described conductive materials of the first protective layer are used when the thickness of the first protective layer exceeds 33 nm, for example, when the thickness thereof is 100 nm, the tact time is shorter than the conventional case of using $(ZnS)_{80}(SiO_2)_{20}$. Thus, the above-described materials are preferable. Even when the foregoing $SnO_2$ is entirely replaced by $In_2O_3$, a similar rewriting property is obtained. However, the DC sputtering is hard to perform in that case.

Moreover, even when 95 atomic % or more of the first protective layer is made of $SiO_2$—$In_2O_3$—$SnO_2$—ZnS, and a part of $In_2O_3$ and/or $SnO_2$ and/or $SiO_2$ is replaced by any one of In—N, Sn—N, Al—N, Ta—N, Ti—N, Cr—N, Si—N and a nitride such as a mixture of the foregoing materials, the composition thus obtained is usable. As the amount of the nitride is increased, the film is likely to come off. Therefore, it is preferable that the replaced amounts of $SiO_2$, $In_2O_3$ and $SnO_2$ are less than 20 mol %, respectively.

When impurity elements become 5 atomic % or more with respect to constituent elements of the first protective layer, the contrast is lowered and the jitter is increased by 1% or more. Therefore, the impurity elements are preferably less than 5 atomic %, more preferably less than 3 atomic %.

(Composition and Film Thickness of the Recording Film)

Instead of the recording film of this embodiment, even by use of a recording film having any one of the following compositions, including: a mixed composition of GeTe and $Sb_2Te_3$, such as $Ge_2Sb_2Te_5$, $Ge_7Sb_4Te_{13}$, $Ge_4Sb_2Te_7$, $Ge_5Sb_2Te_8$, $Ge_6Sb_2Te_9$, $Ge_8Sb_2Te_{11}$ or the like; a composition close to the foregoing mixed composition, such as $Ge_{20}Sb_{24}Te_{56}$ or the like; a composition such as $Ag_2Ge_{21}Sb_{21}Te_{56}$, $Sn_3Ge_{21}Sb_{21}Te_{55}$, $Sn_2Ge_{28}Sb_{16}Te_{54}$, $Sn_{21}Ge_{29}Sb_{15}Te_{54}$ $Sn_3Ge_{33}Sb_{11}Te_{53}$, $Sn_3Ge_{36}Sb_9Te_{52}$, $Sn_7Ge_{19}Sb_{19}Te_{55}$, $Sn_8Ge_{25}Sb_{14}Te_{53}$, $Sn_8Ge_{26}Sb_{13}Te_{53}$, $Sn_7Ge_{30}Sb_{10}Te_{53}$, $Sn_8Ge_{32}Sb_8Te_{52}$ or the like; and a composition close to the foregoing composition, a similar property can be obtained. When a content of any of the constituent elements of the recording film is different from the foregoing composition by 5 atomic % or more, a crystallization rate is too fast, thus causing recrystallization in cooling of the recording film after the melting thereof in the recording. Thus, there occurs a problem such as deformation of the recording mark, occurrence of a residue of erasure due to a too slow crystallization rate, or the like. Therefore, the impurity elements are preferably less than 5 atomic %, more preferably less than 2 atomic %. Besides the above recording film, a recording film having a composition, of which main component is Ge—Sb—Te series, can be also used, the composition including: $Bi_3Ge_{21}Sb_{21}Te_{55}$, $Bi_2Ge_{28}$, $Sb_{16}Te_{54}$, $Bi_2Ge_{29}Sb_{15}Te_{54}$, $Bi_3Ge_{33}Sb_{11}Te_{53}$, $Bi_3Ge_{36}Sb_9Te_{52}$, $Bi_7Ge_{19}Sb_{19}Te_{55}$, $Bi_8Ge_{25}Sb_{14}Te_{53}$, $Bi_8Ge_{26}Sb_{13}Te_{53}$, $Bi_7Ge_{30}Sb_{10}Te_{53}$, $Bi_8Ge_{32}Sb_8Te_{52}$ and a composition close to the foregoing compositions. Moreover, a recording film in which an additive element is added to the foregoing composition can be used. However, the number of possible rewrites is lowered by 10%.

When the film thickness of the recording film is too thin, formation of a crystal nucleus is insufficient in deletion, and a contrast is lowered in a disk with a thin first protective layer. Moreover, since intensity of the reproduce signal is also lowered, a jitter of the reproduce signal exceeds the allowable range. Thus, the thickness of the recording film is preferably 5 nm or more. Moreover, when the thickness of the recording film is 13 nm or more, which is too thick, a recrystallization area becomes too large. Accordingly, the jitter exceeds 13% after overwrites of 10 times. Thus, the thickness of the recording film is preferably less than 13 nm.

(Composition and Film Thickness of the Interface Layer)

$Cr_2O_3$ of the interface layer has a effect of preventing diffusion of the components of the protective layer material into the recording film and improving the crystallization rate. Therefore, together with the first protective layer, the interface layer has a function of increasing the number of possible rewrites.

Moreover, the interface layer has an advantage as the following and the like. Specifically, the interface layer can be formed by use of atmospheric gas including only Ar and is excellent in adhesiveness with other layers. Instead of $Cr_2O_3$, by use of a nitride such as a Ta—O series material, a Ge—Cr—N series material having a composition of $Ge_{50}Cr_{10}N_{40}$ and the like and including Ge or Si by 30 atomic % to 60 atomic % and Cr by 5 atomic % to 20 atomic %, a Si—Cr—N series material, a Ge—Si—Cr—N series material, a Ti—N series material such as $Ti_{60}N_{40}$ and the like, a Ta—N series material such as $Ta_{55}N_{45}$ and the like, a Sn—N series material such as $Sn_{70}N_{30}$ and the like, the effect of improving the crystallization rate is large. However, the number of possible rewrites is reduced by 20% to 30%. When a part of $Cr_2O_3$ is replaced by any of the foregoing materials, the reduction in the number of possible rewrites is suppressed, compared to the case of replacing the same entirely. However, the effect of improving the crystallization rate is somewhat small.

When the linear velocity is 10 m/s or less, even by use of an Sn oxide such as $SnO_2$, there is no problem in terms of the crystallization rate of the recording film, and the film formation rate thereof is three times as fast as the case using $Cr_2O_3$, which is preferable. However, the number of possible rewrites is reduced by 20%. Sn—O—N series material is also available. These materials including Sn are relatively low in the thermal conductivity, and thus it is possible to combine the interface layer and the protective layer together to be a single layer. Particularly, inclusion of an oxide of Cr and Ge or a nitride thereof by 60 mol % or more improves a storage life and enables maintenance of high performance in an environment of a high temperature and a high humidity. Moreover, a Ge-containing composition such as GeN, GeO and the like is preferable because a sputtering rate thereof in film formation is faster than the others, thus enabling the tact time in manufacturing to be shortened. Note that the material cost thereof is relatively expensive.

Next to the foregoing materials, $SiO_2$, $Al_2O_3$, $Ta_2O_5$ and a mixture of $Ta_2O_5$ and $Cr_2O_3$, Cr—N, Ge—N or Ge—O are preferable. Next to the above-described materials, ZnO, $ZrO_2$, $Y_2O_3$, $Cr_2O_3$ and a mixture of Cr—N, Ge—N and $Ta_2O_5$ are preferable. CoO, $Cr_2O$ and NiO are more preferable because particle diameters in the initial crystallization become uniform and a jitter increase in the early stage of the rewriting is small. Moreover, an AlN, BN, CrN, $Cr_2N$, GeN, HfN, $Si_3N_4$ or Al—Si—N series material (for example, $AlSiN_2$), an Si—N series material, Si—O—N series material and a nitride such as TaN, TiN, ZrN and the like are preferable because adhesivity is increased and deterioration of the information recording medium due to an external impact is reduced. A $Cr_2O_3$—ZnS interface layer obtained by adding ZnS to $Cr_2O_3$ has an effect of improving a recording sensitivity. However, the addition of ZnS causes reduction in reflectivity in the numerous rewritings. When the ZnS amount is too much, the reflectivity is reduced by 5% or more in the numerous rewritings. Thus, the ZnS amount needs to be less than 15 mol %.

The interface layer with the film thickness of 1 nm or more has an effect of avoiding appearance of an adverse influence in which the protective layer material such as ZnS diffuses into the recording film after many times of overwrites and has an effect of improving adhesiveness. In order to sufficiently obtain the effect of improving the crystallization rate, the thickness of the interface layer is desirably 2 nm or more. However, in the case of the interface layer on the side where light is made incident, when the thickness of the interface layer made of $Cr_2O_3$ exceeds 3 nm, light absorption of the layer causes a problem such as reduction in reflectivity. Thus, the thickness thereof is desirably 5 nm or less. However, in order to maintain balance of thermal diffusion in upper and lower layers, the thickness thereof may be slightly thicker than the above, for example 7 nm.

Accordingly, the film thickness of the interface layer on the side where light is made incident is preferably in the range of 1 nm to 8 nm. Moreover, when the protective layer, which is in contact with the interface layer, is an oxide or a nitride, the interface layer is used for the purpose of improving the adhesiveness because the protective layer has the effect of improving the crystallization rate. Therefore, when 40 mol % or more of the first protective layer is made of an oxide, an oxide-nitride or a nitride, the thickness of the interface layer on the side where light is made incident is preferably in the range of 1 nm to 3 nm.

Other than the above, in an interface layer of, for example, Ge—Cr—N, which is lower in absorptivity than $Cr_2O_3$, there is no problem even when the interface layer has a much thicker film thickness. However, since the material of the interface layer has a low sputtering rate, it is preferably to set the thickness thereof to 20 nm from the viewpoint of productivity.

When impurity elements become 5 atomic % or more with respect to the constituent elements of the interface layer, the crystallization rate is lowered and a jitter increase in overwriting becomes 1% or more. Thus, the impurity elements are preferably less than 5 atomic %, more preferable less than 3 atomic %.

(Composition and Film Thickness of the Reflective Layer)

For the reflective layer, in order to adjust an absorptivity ratio and maintain a high contrast, Cr, Al, In, Ni, Mo, Pt, Pd, Ti, W, Ge, Sb, Bi, and an alloy or a compound, which contain any of the above elements, are used. A content of these elements in the alloy or the compound is preferably 50 atomic % or more. The reflective layer moderately absorbs light and moderately filters out the light. Thus, light permeating through the recording film in the recording mark portion where the reflectivity is low is reflected on the reflective layer and absorbed again by the recording film, thereby preventing a temperature from being excessively increased and enabling Ac/Aa to be 1 or more. Ac and Aa indicate absorption coefficients of crystalline state and of amorphous state, respectively. Ac/Aa is an absorption rate of a recording film. Forming the reflective layer of an alloy containing at least one element among Au, Ag, Cu and Al in order to adjust the thermal diffusion has an effect in quality improvement of the reproduce signal.

In a high-density phase change optical disk, because of a narrow track pitch, consideration needs to be made for a phenomenon called a cross erase, in which a part of recording marks already written in adjacent tracks is deleted. However, in order to prevent this cross erase, a thermal diffusion in a longitudinal direction is important. One of the reasons why the thermal diffusion in the longitudinal direction is important is that the diffusion in the longitudinal direction hinders heat from going to the direction of the adjacent track. If Ac/Aa is larger than 1, a temperature increase in a recording mark portion of the adjacent track is reduced, thus leading to a good solution from the view point of the cross erase prevention.

In order to prevent the cross erase, prevention of recrystallization is also important. This is because, as shown in FIG. 8, when a portion remaining as an amorphous recording mark is reduced by recrystallization from a peripheral portion after the melting of the recording film in the recording, a wider area needs to be melt in order to form a recording mark of a predetermined size, and the temperature of the adjacent track is apt to increase. If the heat diffuses in the longitudinal direction, the recrystallization can be prevented. This is because, in the formation of the recording mark, heat in a center portion diffuses in a lateral direction, and cooling of the peripheral portion of the melted area becomes slow, thus preventing the recording film from being apt to be crystallized.

For the material of the reflective layer, preferable are: one having Cr or Cr alloy as a main component, including Cr, Cr—Al, Cr—Ag, Cr—Au, Cr—Ge and Cr—Ti; one having a Al alloy as a main component, such as Al—Ti, Al—Cr, Al—In and the like; Ge—Cr; Ge—Si; and Ge—N. Other than the above, one having Co, Ni, Mo, Pt, W, Ge, Sb, Bi, Ag, Au or Cu as a main component is also usable.

When a content of the element other than Cr and the like is in the range of 0.5 atomic % to 20 atomic %, a property in the numerous rewritings and a bit error rate are improved and are more improved when the content thereof is in the range of 1 atomic % to 10 atomic %. When oxygen (O) of 20 atomic % or less is added into Cr, the peeling off of the film is unlikely to occur, which is preferable. Addition of Ti also has an effect similar to the above.

When a content of the element other than Al and the like is in the range of 3 atomic % to 20 atomic %, the property in the numerous rewritings and the bit error rate are improved and are more improved when the content thereof is in the range of 5 atomic % to 15 atomic %.

When a content of the element other than Ge and the like is in the range of 0 atomic % to 80 atomic %, the property in the numerous rewritings and the bit error rate are improved and are more improved when the content thereof is in the range of 2 atomic % to 50 atomic %.

One having an Ag alloy as a main component such as Ag—Pd, Ag—Cr, Ag—Ti, Ag—Pt, Ag—Cu, Ag—Pd—Cu and the like, one having an Au alloy as a main component such as Au—Cr, Au—Ti, Au—Ag, Au—Cu, Au—Nd and the like, and one having a Cu alloy as a main component are also high in reflectivity and satisfactory in a reproducing property. However, Pt and Au are noble metals and are thus expensive. In some cases, the two elements increase the cost compared to Cr, Al, Co, Ni, Mo, Ag, W, Ge, Sb and Bi.

When impurity elements are 5 atomic % or more with respect to the constituent elements of the reflective layer, the thermal conductivity is lowered and a jitter increase in the numerous rewritings becomes large. Thus, the impurity elements are preferably less than 5 atomic %, more preferably less than 3 atomic %.

Accordingly, the film thickness of the reflective layer is preferably in the range of 10 nm to 70 nm. When the thickness thereof is too thin, a degree of modulation is reduced, and a jitter increase occurs in the numerous rewritings due to insufficient cooling of the heat. On the other hand, when the thickness thereof is too thick, the absorptivity ratio is small, a jitter increase occurs in the overwriting, and groove deformation occurs due to stress of the substrate.

(Composition and Film Thickness of the Second Protective Layer)

For the second protective layer, usable are: a Sn—O or Sn—O—N material such as $SnO_2$ and the like; a Sn—Si—O, Sn—Si—N or Sn—Si—O—N material such as $SnO_2$—$SiO_2$, $SnO_2$—$Si_3N_4$, $SnO_2$—$SiO_2$—$Si_3N_4$ and the like; a Sn—Al—O, Sn—Al—N or Sn—Al—O—N material such as $SnO_2$—$Al_2O_3$, $SnO_2$—AlN, $SnO_2$—$Al_2O_3$—AlN and the like; a Sn—Cr—O, Sn—Cr—N or Sn—Cr—O—N material such as $SnO_2$—$Cr_2O_3$, $SnO_2$—CrN, $SnO_2$—$Cr_2O_3$—CrN and the like; a Sn—Mn—O, Sn—Mn—N or Sn—Mn—O—N material such as $SnO_2$—$Mn_3O_4$, $SnO_2$—$Mn_5N_2$, $SnO_2$—$Mn_3O_4$—$Mn_5N_2$ and the like; a Sn—Ta—O, Sn—Ta—N or Sn—Ta—O—N material such as $SnO_2$—$Ta_2O_5$, $SnO_2$—$Ta_2N$, $SnO_2$—$Ta_2O_5$—$Ta_2N$ and the like; a Sn—Ge—O, Sn—Ge—N or Sn—Ge—O—N material such as $SnO_2$—$GeO_2$, $SnO_2$—$Ge_3N_4$, $SnO_2$—$GeO_2$—$Ge_3N_4$ and the like; a Sn—Ti—O, Sn—Ti—N or Sn—Ti—O—N material such as $SnO_2$—$TiO_2$, $SnO_2$—$Ti_2N$, $SnO_2$—$TiO_2$—$Ti_2N$ and the like; a Sn—Mo—O, Sn—Mo—N or Sn—Mo—O—N material such as $SnO_2$—$MoO_3$, $SnO_2$—$Mo_2N$—MoN, $SnO_2$—$MoO_2$—$Mo_2N$—MoN and the like; a Sn—Zr—O, Sn—Zr—N or Sn—Zr—O—N material such as $SnO_2$—$ZrO_2$, $SnO_2$—ZrN, $SnO_2$—$ZrO_2$—ZrN and the like; a Sn—Co—O, Sn—Co—N or Sn—Co—O—N material such as $SnO_2$—$Co_2O_3$, $SnO_2$—$Co_2N$, $SnO_2$—$Co_2O_3$—$Co_2N$ and the like; a Sn—In—O, Sn—In—N or Sn—In—O—N material such as $SnO_2$—$In_2O_3$, $SnO_2$—In—N, $SnO_2$—$In_2O_3$—N and the like; a Sn—Zn—O, Sn—Zn—N or Sn—Zn—O—N material such as $SnO_2$—ZnO, $SnO_2$—Zn—N, $SnO_2$—ZnO—Zn—N and the like; a Sn—Gd—O, Sn—Gd—N or Sn—Gd—O—N material such as $SnO_2$—$Gd_2O_3$, $SnO_2$—$Gd_2N$, $SnO_2$—$Gd_2O_3$—$Gd_2N$ and the like; a Sn—Bi—O, Sn—Bi—N or Sn—Bi—O—N material such as $SnO_2$—$Bi_2O_3$, $SnO_2$—Bi—N, $SnO_2$—$Bi_2O_3$—Bi—N and the like; a Sn—Ni—O, Sn—Ni—N or Sn—Ni—O—N material such as $SnO_2$—$Ni_2O_3$, $SnO_2$—Ni—N, $SnO_2$—$Ni_2O_3$—Ni—N and the like; a Sn—Nb—O, Sn—Nb—N or Sn—Nb—O—N material such as $SnO_2$—$Nb_2O_3$, $SnO_2$—NbN, $SnO_2$—$Nb_2O_3$—NbN and the like; a Sn—Nd—O, Sn—Nd—N or Sn—Nd—O—N material such as $SnO_2$—$Nd_2O_3$, $SnO_2$—NdN, $SnO_2$—$Nd_2O_3$—NdN and the like; a Sn—V—O, Sn—V—N or Sn—V—O—N material such as $SnO_2$—$V_2O_3$, $SnO_2$—VN, $SnO_2$—$V_2O_3$—VN and the like; and a mixture of the foregoing materials, such as a Sn—Cr—Si—O—N material, a Sn—Al—Si—O—N material, a Sn—Cr—Co—O—N material and the like.

Among the foregoing materials, the Sn—O or Sn—O—N material has extremely fast film formation rate, which is approximately twice as fast as $(ZnS)_{80}(SiO_2)_{20}$, which is the conventional material, and is preferable in terms of its suitability to mass production. Moreover, when the Sn—O or Sn—O—N material in the mixed material occupies 70 mol % or more of the total composition, the film formation rate is about 1.5 times as fast as that of $(ZnS)_{80}(SiO_2)_{20}$. When the Cr—O or Cr—O—N material in the mixed material occupies 70 mol % or more of the total composition, thermal stability thereof is better than that of the Sn—O or Sn—O—N material, and thus deterioration of a deletion ratio in rewriting is unlikely to occur. When the Mn—O or Mn—O—N material is used instead of the Cr—O or Cr—O—N material, a similar effect can be achieved.

The Sn—Gd—O, Sn—Gd—N or Sn—Gd—O—N material, the Sn—Bi—O, Sn—Bi—N or Sn—Bi—O—N material and the Sn—Zr—O, Sn—Zr—N or Sn—Zr—O—N material also have a high stability. However, the above materials are lower in the sputtering rate by about 10% than the Sn—Cr—O or Sn—Cr—O—N material and the Sn—Mo—O or Sn—Mn—O—N material. Moreover, when the Sn—Ge—O, Sn—Ge—N or Sn—Ge—O—N material is used for the second protective layer, the adhesivity thereof with the recording film is increased, thus improving its storage life. Even when the Sn—Mo—O or Sn—Mo—O—N material is used instead of the Sn—Ge—O, Sn—Ge—N or Sn—Ge—O—N material, a similar effect can be obtained.

On the other hand, the Sn—In—O, Sn—In—N or Sn—In—O—N material has a low electrical resistance, thus having an advantage that the DC sputtering can be performed therefor. When the content of In is more than that of Sn, the sputtering rate can be increased twice as much. However, after rewrites of 500 times or more, a change in reflectivity occurs. Also for the Sn—Zn—O, Sn—Zn—N or Sn—Zn—O—N material, the DC sputtering can be performed. Moreover, the Sn—O—Zn—S material obtained by adding ZnS to $SnO_2$ is also usable.

By use of a Ge—Cr—N series material, a Si—Cr—N series material or a Ge—Si—Cr—N series material, which have a composition of $Ge_{50}Cr_{10}N_{40}$ and the like and contains Ge or Si by 30 atomic % to 60 atomic % and Cr by 5 atomic % to 20 atomic %, or by use of a material containing Zn or O as a main component (70 atomic % or more in total), thermal diffusivity can be lowered, thus lowering reduction in the recording sensitivity.

When a thermal conductivity of the second protective layer is too high, heat spreads laterally in recording, thus causing a cross erase to be likely to occur. Therefore, a composition ratio of a mixed material of materials with a high thermal conductivity, which are $SiO_2$, $Al_2O_3$, $Cr_2O_3$ and $Ta_2O_5$, is preferably 30 mol % or less. Moreover, when ZnS is mixed in the material, the sputtering rate is increased, and thus production tact can be shortened. When ZnS is added therein by 20 mol %, the sputtering rate is increased by 10%. However, when the second protective layer is in contact with the recording film, many times of rewriting causes blending of ZnS into the recording film, reduces the crystallization rate and results in a jitter increase. An amount of the mixed ZnS is preferably 30 mol % or less. If the amount of ZnS is out of the above range, the jitter increase in rewriting becomes 1% or more. Moreover, mixing of a material including a nitrogen compound is also possible, the material including the Ge—Cr—N series material such as $Ge_{50}Cr_{10}N_{40}$ or the like, the Si—Cr—N series material such as $Si_{50}Cr_{10}N_{40}$ or the like. However, the sputtering rate is low, and thus the productivity is lowered to some extent.

When impurity elements are 5 atomic % or more with respect to constituent elements of the second protective layer, a contrast is lowered and a jitter is increased. Thus, the impurity elements are preferably less than 5 atomic %, more preferably less than 3 atomic %.

When a relationship among the thickness of the second protective layer, the jitter increase due to the cross erase and the reflectivity after initialization is investigated, the following result is obtained.

TABLE 2

| Film thickness of the second protective layer (nm) | Jitter increase due to cross erase (%) | Reflectivity after initialization (%) |
|---|---|---|
| 20 | 5 | 25 |
| 25 | 2 | 22 |
| 28 | 1.0 | 21 |
| 30 | 1.0 | 20 |
| 35 | 0.8 | 19 |
| 40 | 0.5 | 17 |
| 45 | 0.5 | 15 |
| 50 | 0.4 | 13 |

From the above result, in order for an overwrite property to be in a practical level, since the jitter increase due to the cross erase needs to be less than 3% and the reflectivity needs to be 15% or more, a preferable thickness of the second protective layer is in the range of 25 nm to 45 nm, more preferably in the range of 28 nm to 40 nm. Optically speaking, the same condition as described above is established regarding the overwrite property even when the second protective layer is thicker at a ½ cycle of a value obtained by dividing a wavelength by a refraction index. However, deformation and a clack of the substrate occur due to the stress of the film, and time required for film formation gets long, which is unpractical. Note that, when the reflectivity of the medium is lower than 15%, there occur problems such as that a degree of modulation of a recording and reproducing signal is low, that recording and reproducing cannot be performed due to instability of AF and tracking, and the like. Thus, the reflectivity of the medium is preferably 15% or more. From the reasons described above and the like, also in the DVD-RAM standard, the reflectivity is decided to be 15% or more.

(Absorption Control Layer)

When Mo, W, Fe, Sb, Mn, Ti, Co, Ge, Pt, Ni, Nb, Pd, Be or Ta is used as a material replacing Cr in the $Cr_{90}(Cr_2O_3)_{10}$ film of the absorption control layer, a similar effect is obtained. Moreover, Pd and Pt are preferable because these elements are low in reactivity to the other layers, and thus the number of possible rewrites is further increased. The use of Ni or Co enables use of a less expensive target than others, thus enabling reduction of the total manufacturing cost. Cr and Mo are high in corrosion resistance and are satisfactory in a result of a life test compared to the others. Ti is also high in the corrosion resistance, and thus a satisfactory property is obtained. Moreover, Tb, Gd, Sm, Cu, Au, Ag, Ca, Al, Zr, Ir, Hf and the like are also usable.

For a material replacing $Cr_2O_3$ in the $Cr_{90}(Cr_2O_3)_{10}$ film of the absorption control layer, the following materials may be used, including: an oxide such as $SiO_2$, SiO, $Al_2O_3$, BeO, $Bi_2O_3$, CoO, CaO, $CeO_2$, $Cu_2O$, CuO, CdO, $Dy_2O_3$, FeO, $Fe_2O_3$, $Fe_3O_4$, GeO, $GeO_2$, $HfO_2$, $In_2O_3$, $La_2O_3$, MgO, MnO, $MoO_2$, $MoO_3$, NbO, $NbO_2$, NiO, PbO, PdO, SnO, $SnO_2$, $Sc_2O_3$, SrO, $ThO_2$, $TiO_2$, $Ti_2O_3$, TiO, $Ta_2O_5$, $TeO_2$, VO, $V_2O_3$, $VO_2$, $WO_2$, $WO_3$, $Y_2O_3$, $ZrO_2$ and the like; a sulfide such as ZnS, $Sb_2S_3$, CdS, $In_2S_3$, $Ga_2S_3$, GeS, $SnS_2$, PbS, $Bi_2S_3$, SrS, MgS, CrS, CeS, $TaS_4$ and the like; a selenide such as $SnSe_2$, $Sb_2Se_3$, CdSe, ZnSe, $In_2Se_3$, $Ga_2Se_3$, GeSe, $GeSe_2$, SnSe, PbSe, $Bi_2Se_3$ and the like; a fluoride such as $CeF_3$, $MgF_2$, $CaF_2$, $TiF_3$, $NiF_3$, $FeF_2$, $FeF_3$ and the like; Si; Ge; a boride such as $TiB_2$, $B_4C$, B, CrB, $HfB_2$, $TiB_2$, WB and the like; a carbide such as C, $Cr_3C_2$, $Cr_{23}C_6$, $Cr_7C_3Fe_3C$, $Mo_2C$, WC, $W_2C$, HfC, TaC, $CaC_2$ and the like; a nitride such as Ta—N, AlN, BN, CrN, $Cr_2N$, GeN, HfN, $Si_3N_4$, a Al—Si—N series material (for example, $AlSiN_2$), a Si—N series material, a Si—O—N series material, TiN, ZrN and the like; and a material having a composition close to those of the foregoing materials. Moreover, a mixed material of the foregoing materials is also usable.

Among the above, the use of any of the above-described oxides enables use of a less expensive target than the others, thus enabling reduction in the total manufacturing cost. Among the oxides, $SiO_2$ and $Ta_2O_5$ are preferable because these two are low in reactivity, and thus the number of possible rewrites is further increased. Since $Al_2O_3$ is high in thermal conductivity, when $Al_2O_3$ is used in a disk having a structure with or without a reflective layer, deterioration of a rewriting property is smaller than the other cases. $Cr_2O_3$ is preferable because both of a melting point thereof and a thermal conductivity thereof are high.

Moreover, the use of any of the above-described sulfides enables the sputtering rate to be increased, thus enabling to shorten the film formation time. The use of any of the above-described carbides increases hardness of the absorption control layer and also brings about a function of suppressing flow of the recording film in the numerous rewritings.

When both of the metal element and/or a dielectric material have melting points higher than a melting point (about 600 degrees Celsius) of the recording film, a jitter increase after rewrites of 10000 times is reduced. When the melting points of the both are 600 degrees Celsius or higher, the jitter increase can be suppressed to 3% or less, which is preferable.

(Substrate)

In this embodiment, the polycarbonate substrate 1 is used, which has the tracking grooves directly on its surface. The substrate having the tracking grooves is a substrate having grooves of a depth of $\lambda/10n'$ (n' is a refraction index of a substrate material) or more in a part of or all over its surface when a recording and reproducing wavelength is set as $\lambda$. The groove may be formed to be continuous in a lap or may be divided therein. It is found out that, when the groove depth is about $\lambda/6n'$, a crosstalk is reduced, which is preferable. Moreover, groove widths may be different from each other depending on positions thereof. If an inner groove has a narrower width, a problem is unlikely to occur in the numerous rewritings. The substrate of this embodiment may be a substrate having formats for recording and reproducing in both of the groove and the land or may be a substrate having the format for recording in either thereof. When ultraviolet curing resin is applied onto the reflective layers of the first and second disk members in a thickness of about 10 μm before attachment of the members on each other and the attachment is performed after the resin is cured, the error rate can be lowered more. In this embodiment, the two disk members are prepared, and the respective reflective layers 7 of the first and second disk members are attached to each other with the adhesive layer interposed therebetween. If the substrate material is changed from polycarbonate to a material having polyolefin as a main component, it is preferable because rigidity of the substrate surface is increased and a deformation amount of the substrate due to heat is reduced by 10%. However, the material cost thereof increases twice or more.

(Production Tact)

As to the information recording medium of the embodiment 1, the tact of the lamination of the layers is decided depending on the sputtering rate of the respective films and the film thicknesses of the laminated layers. The tact to be rate controlling is 9 seconds. In a table below, description for the additives of the first protective layer is omitted.

The lamination tact in the information recording medium of the embodiment 1.

TABLE 3

| Chamber number (formed layer) | Constitution material | Film thickness (nm) | Lamination time (s) |
| --- | --- | --- | --- |
| 1 (First protective layer) | $(SiO_2)_{60}(In_2O_3)_{35}(SnO_2)_5$ | 8 | 3 |
| 2 (Interface layer) | $Cr_2O_3$ | 2 | 3 |
| 3 (Recording film) | $Ge_7Sb_2Te_4$ | 10 | 6 |
| 4 (Second protective layer) | $SnO_2$ | 33 | 6 |
| 5 (Absorption control layer) | $Cr_{90}(Cr_2O_3)_{10}$ | 34 | 9 |
| 6 (Reflective layer) | Al | 60 | 9 |

As is clear from the table, since the thicknesses of the respective laminated films in the information recording medium of the present invention are thin, the lamination tact for one layer is short. Therefore, the disk of the present invention is much superior to the conventional disk from the viewpoint of the mass production.

[Embodiment 2]

COMPARATIVE EXAMPLE 1

A disk (comparative example 1), which is different from the disk of the embodiment 1 only in the first protective layer, is prepared, and the tact is compared therebetween by a similar method to the embodiment 1. Then, the following result is obtained.
(Production Tact)

As to the information recording medium of the comparative example 1, when six layers are formed by use of a film formation device, the lamination tact is 40 seconds, which is decided depending on a sputtering rate of a material constituting each of the layers and a film thickness of the laminated layer.

TABLE 4

| Chamber number (formed layer) | Constitution material | Film thickness (nm) | Lamination time (s) |
| --- | --- | --- | --- |
| 1 (First protective layer) | $(ZnS)_{80}(SiO_2)_{20}$ | 120 | 40 |
| 2 (Interface layer) | $Cr_2O_3$ | 2 | 3 |
| 3 (Recording film) | $Ge_7Sb_2Te_4$ | 10 | 6 |
| 4 (Second protective layer) | $SnO_2$ | 33 | 6 |
| 5 (Absorption control layer) | $Cr_{90}(Cr_2O_3)_{10}$ | 34 | 9 |
| 6 (Reflective layer) | Al | 60 | 9 |

In a film formation device having seven chambers or more, the tact can be further shortened. However, the foregoing device is much more expensive than the one with six chambers, which is widespread in manufacturers, and thus a manufacturing cost thereof is high.

Figure 10:
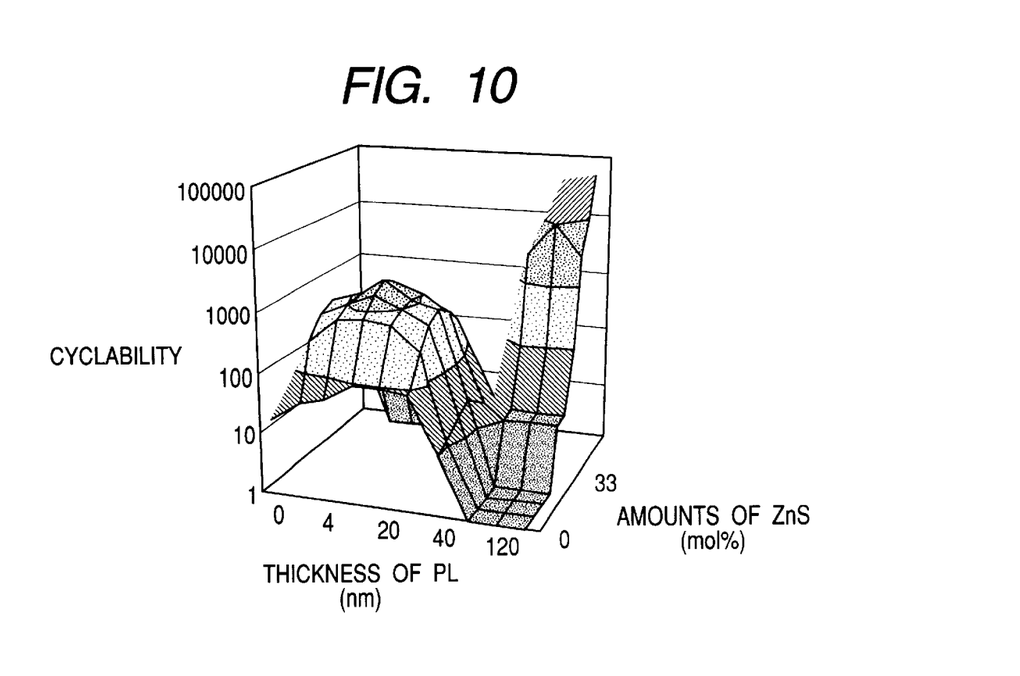
FIG. 10 is a graph showing a relationship among the number of overwriting of the present invention and the comparative example, a film thickness of a first protective layer and a ZnS additive amount.

Moreover, a disk, in which the thickness of the first protective layer and the ZnS amount are changed, is prepared, and the number of possible rewrites is investigated. Then, the result of the embodiment 1 and a result in the vicinity of the comparative example 1 are shown in FIG. 10. In the vicinity of the comparative example 1 in which the thickness of the first protective layer is about 120 nm and ZnS is about 80 mol %, the number of possible rewrites is large. However, as described above, the formation of the first protective layer takes long.

Furthermore, when the first protective layer is as thick as 100 nm or more, deformations caused by the stress acting between the laminated films and the substrate are different between the pre-format portion and the user data portion, thus bringing about a state where the recording track bends toward the pre-format portion. Thus, in the case of performing the push-pull tracking for the tracking grooves, the address data in the pre-format portion are unreadable. When the tracking offset is corrected so as to set the recording track in a normal position with respect to the pre-format portion, there occurs a problem that the offset in the recording area partially deletes data of the adjacent track.
[Embodiment 3]

COMPARATIVE EXAMPLE 2

A disk (comparative example 2), which is different from the disk of the embodiment 1 only in the material of the first protective layer, is prepared, and a jitter in the numerous rewritings is measured by use of a similar method to the embodiment 1. Then, as shown in FIG. 7, the jitter increases to 13% or more after overwrites of more than 100 times.

Figure 9:
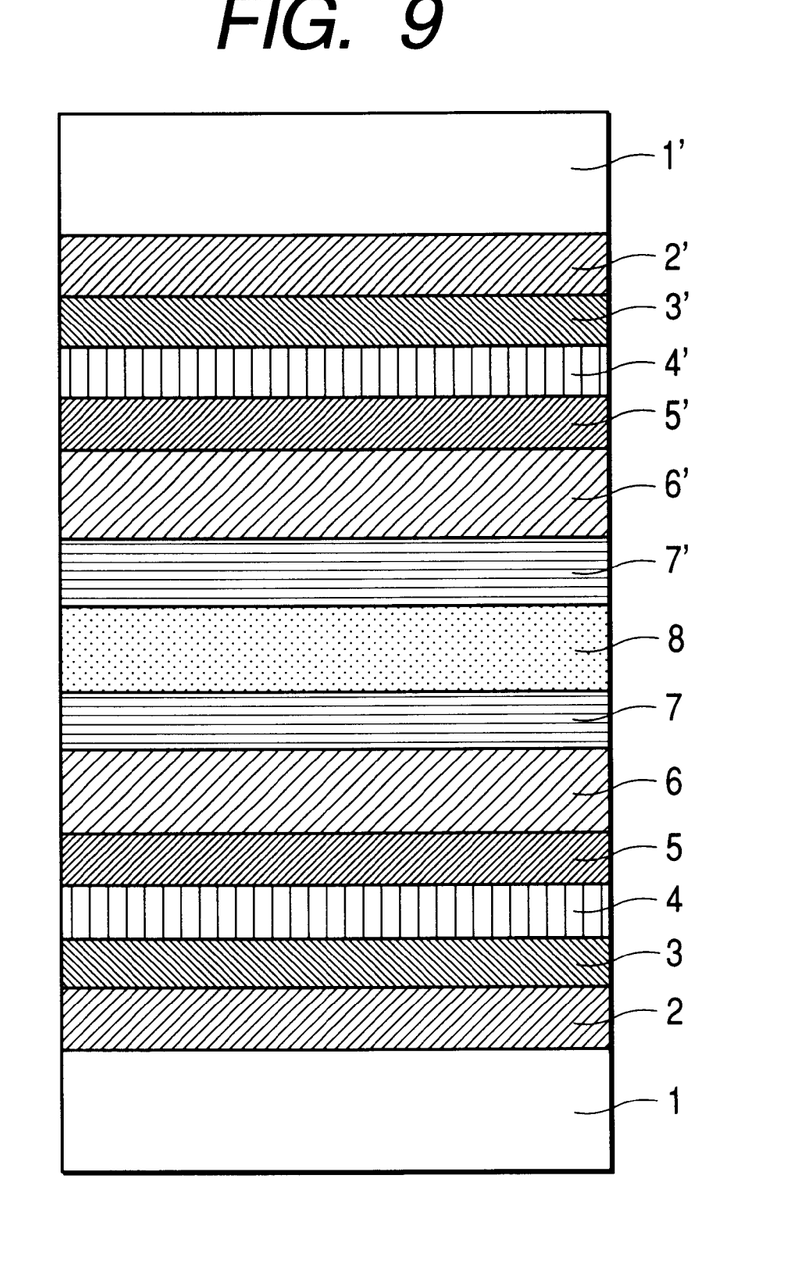
FIG. 9 is a section view schematically showing an example of an information recording medium according to a comparative example.

As to the first protective layer according to the comparative example 2, a first protective layer 2 made of $(SiO_2)_{60}((In_2O_3)_{90}(SnO_2)_{10})_{40}$ is formed with a film thickness of 8 nm. As to a method for forming the film, sputtering is performed in an Ar gas atmosphere.
[Embodiment 4]

A disk, which is different from the disk of the embodiment 1 only in the first protective layer, is prepared, and a jitter in the numerous rewritings is measured by use of a similar method to the embodiment 1. Then, similar to the embodiment 1, an effect that a jitter in random pattern recording after overwrites of 1000 times can be reduced to 13% or less is obtained.

As to the first protective layer according to the embodiment 4, a first protective layer 2 made of $(SiO_2)_{60}((In_2O_3)_{90}(SnO_2)_{10})_{25}(ZnS)_{15}$ is formed with a film thickness of 8 nm. As to a method for forming the film, sputtering is performed by use of a mixed gas containing 10% (volume ratio) of $CO_2$ in an Ar gas. Thus, $CO_2$ or a chemical compound of C is added into the first protective layer, thus obtaining an effect of increasing the number of possible rewrites. When $CO_2$ or the chemical compound of C is added to the first protective layer material by at least 0.1 atomic % or more, an effect of increasing the number of possible rewrites by 10% is obtained. When the addition amount thereof is 2 atomic % or more, density of the first protective layer is lowered, thus lowering strength thereof. Therefore, the addition amount is preferably less than 2 atomic %. As to the gas for adding C in the film, $CH_4$, $CS_2$ and the like are also usable. However, the gas mixed with $CO_2$ is preferable, because the foregoing gas is inexpensive as the mixed gas used in the production, thus suppressing the increase in the total production cost. Accordingly, the reason why the number of possible rewrites is increased is because, when C or the chemical compound of C is added into the first protective layer, the thermal conductivity of the first protective layer is lowered, and thus heat is unlikely to be transmitted into the substrate, a temperature increase of the substrate in rewriting is prevented and deterioration of the substrate is prevented.
[Embodiment 5]

A first protective layer according to the embodiment 5 is formed of $(SiO_2)_{60}((In_2O_3)_{90}(SnO_2)_{10})_{25}(ZnS)_{15}$. As to a method of forming the film, sputtering is performed by setting a flow rate of the Ar gas used in the sputtering to twice as much as a normal rate or more, for example 400 sccm or more, thus forming the first protective layer. Thus, Ar is contained in the first protective layer, and thus the effect of increasing the number of possible rewrites is obtained. When Ar is added to the first protective layer material by at least 0.1 atomic % or more, an effect of increasing the number of possible rewrites by 10% is obtained. When the addition amount thereof is 2 atomic % or more, density of the first protective layer is lowered, thus lowering strength thereof. Therefore, the addition amount is preferably less than 2 atomic %. When a part of or all of the foregoing Ar is replaced by He, Ne, Kr or Xe, a similar effect is obtained. However, as the gas used in the production, the Ar gas is preferable, because the Ar gas is less expensive than the mixed gas, He, Ne, Kr and Xe, thus suppressing the increase in the total production cost. Accordingly, the reason why the number of possible rewrites is increased is because, when Ar or He, Ne, Kr or Xe is added into the first protective layer, the thermal conductivity of the first protective layer is lowered, and thus heat is unlikely to be transmitted into the substrate, the temperature increase of the substrate in rewriting is prevented and the deterioration of the substrate is prevented.

As described above, according to the present invention, as to an information recording medium for performing high-density recording and reproducing, a medium, which enables film formation by use of a film formation device with six chambers, is excellent in material costs and mass productivity and has satisfactory recording and reproducing characteristic and rewriting property, can be obtained.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An information recording medium capable of rewriting many times, which performs recording when atomic arrangement is changed by irradiation of light, comprising:
a first protective layer; a recording film; a second protective layer; and a reflective layer, which are sequentially laminated on a substrate from a side where light is irradiated, the first protective layer having a film thickness of 2 nm to 25 nm,
wherein 95 atomic percent or more of a material of the first protective layer is composed of $SiO_2$—$In_2O_3$—$SnO_2$—ZnS, and a ZnS amount in the first protective layer is set in the range of 4 mol percent to 33 mol percent.

2. The information recording medium according to claim 1, wherein a part of $In_2O_3$ and/or $SnO_2$ in the $SiO_2$—$In_2O_3$—$SnO_2$—ZnS is replaced by any one of $Al_2O_3$, $Ta_2O_5$, $TiO_2$, $Cr_2O_3$, ZnO and a mixture of the foregoing materials.

3. The information recording medium according to claim 1, wherein a part (less than 20 mol percent) of at least one of $In_2O_3$, $SnO_2$ and $SiO_2$ in the $SiO_2$—$In_2O_3$—$SnO_2$—ZnS is replaced by any one of In—N, Sn—N, Al—N, Ta—N, Ti—N, Cr—N, Si—N and a mixture of the foregoing materials.

4. The information recording medium according to claim 1, wherewith a film thickness of the first protective layer is in the range of 4 nm to 20 nm, and the ZnS amount in the first protective layer is in the range of 6 mol percent to 30 mol percent.

5. The information recording medium according to claim 1, wherein any one of carbon (C) and a carbon compound is contained in the first protective layer.

6. The information recording medium according to claim 1, wherein any one of Ar, He, Ne, Kr and Xe is contained by 0.1 atomic percent or more in the first protective layer.

7. The information recording medium according to claim 1, wherein 95 atomic percent or more of a material of the recording film is composed of Ge—Sb—Te.

8. The information recording medium according to claim 1, wherein an interface layer is provided in contact with the recording film, and 95 atomic percent or more of a material of the interface layer is composed of $Cr_2O_3$.

* * * * *